Sept. 15, 1925.
A. M. MacFARLAND
1,554,014
BALANCING MACHINE
Filed Feb. 4, 1920
6 Sheets-Sheet 2
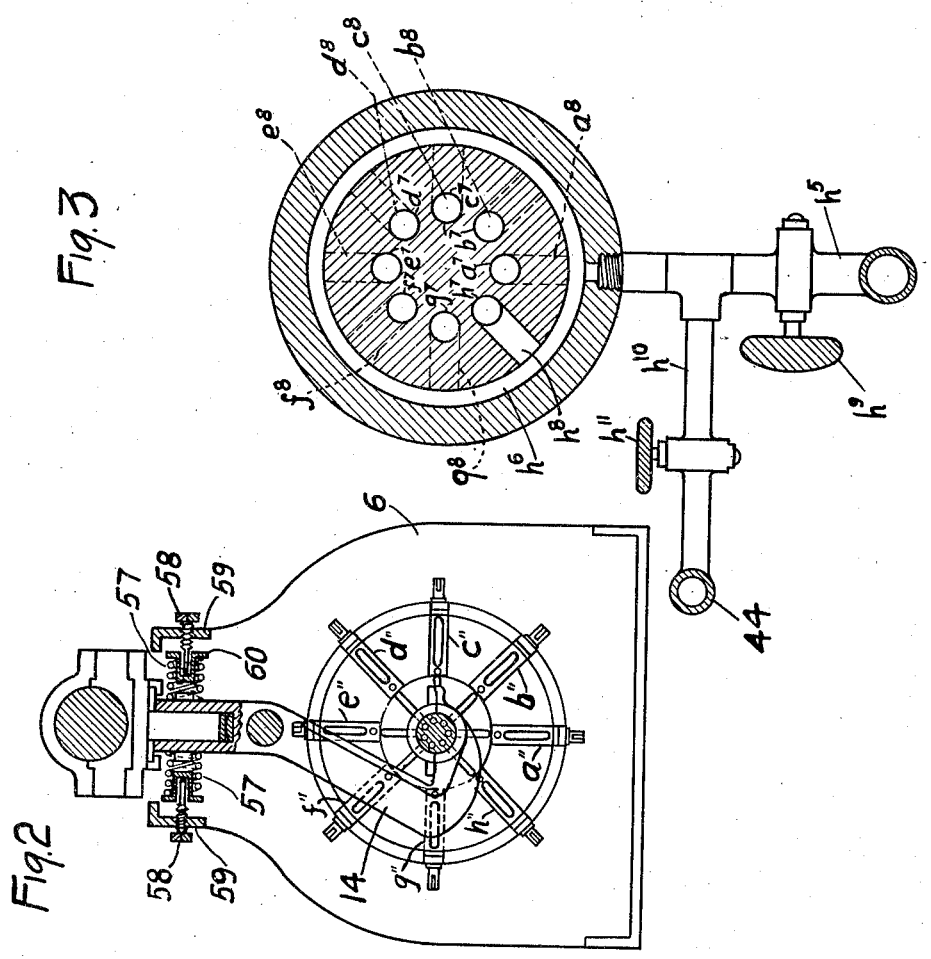
INVENTOR.
Allis M. MacFarland
BY D. C. Davis
ATTORNEY.

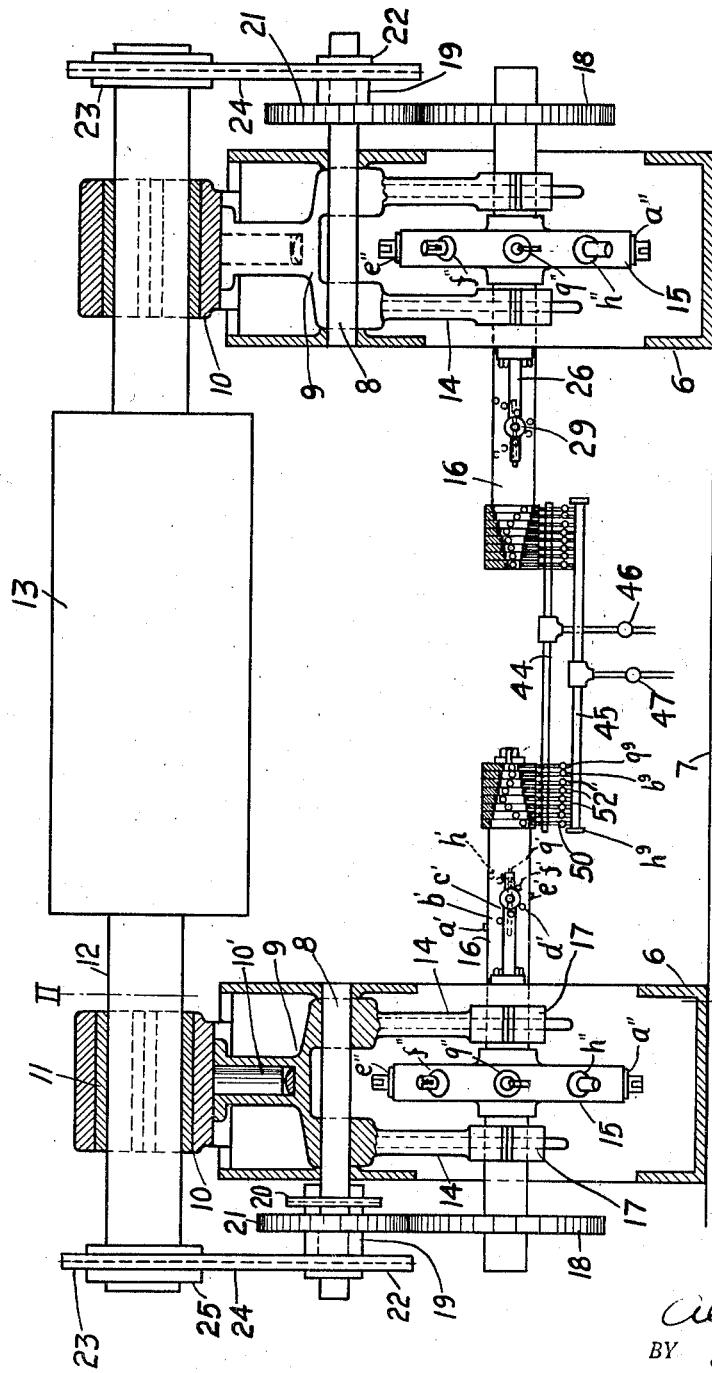

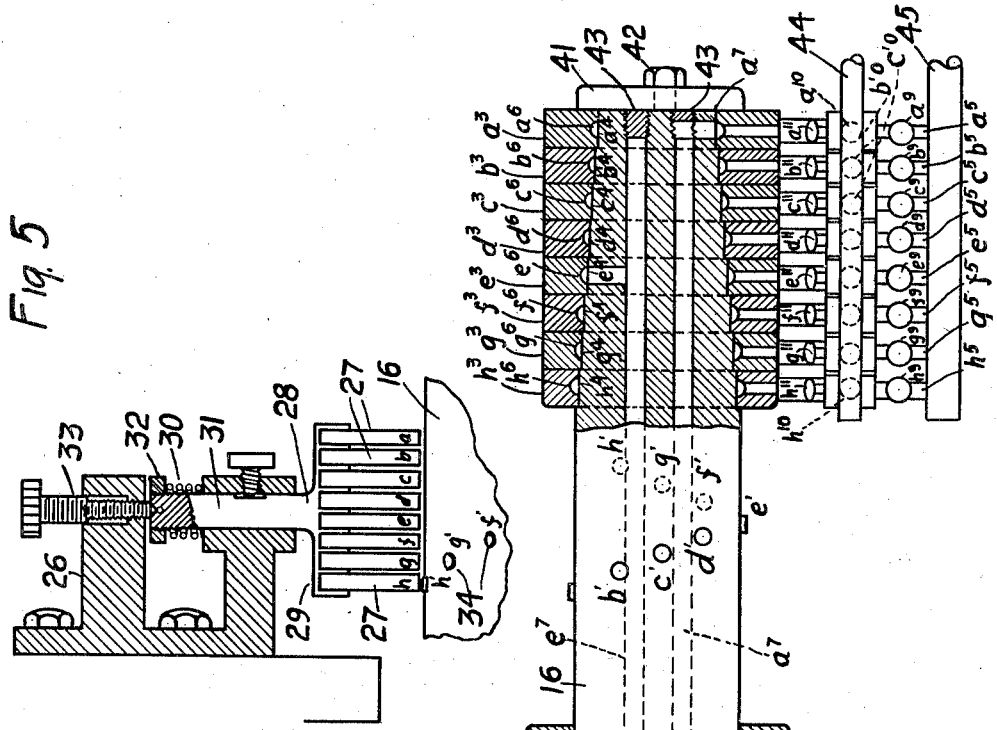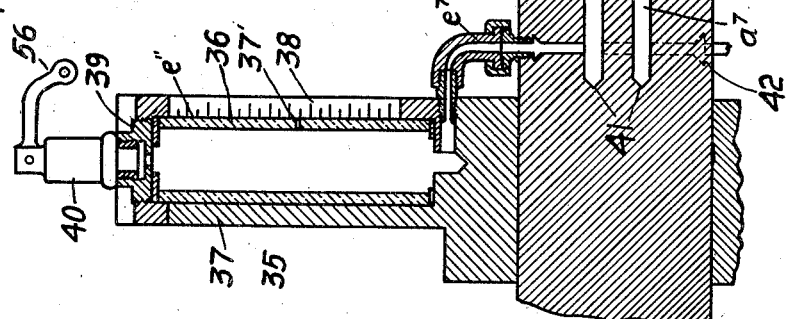

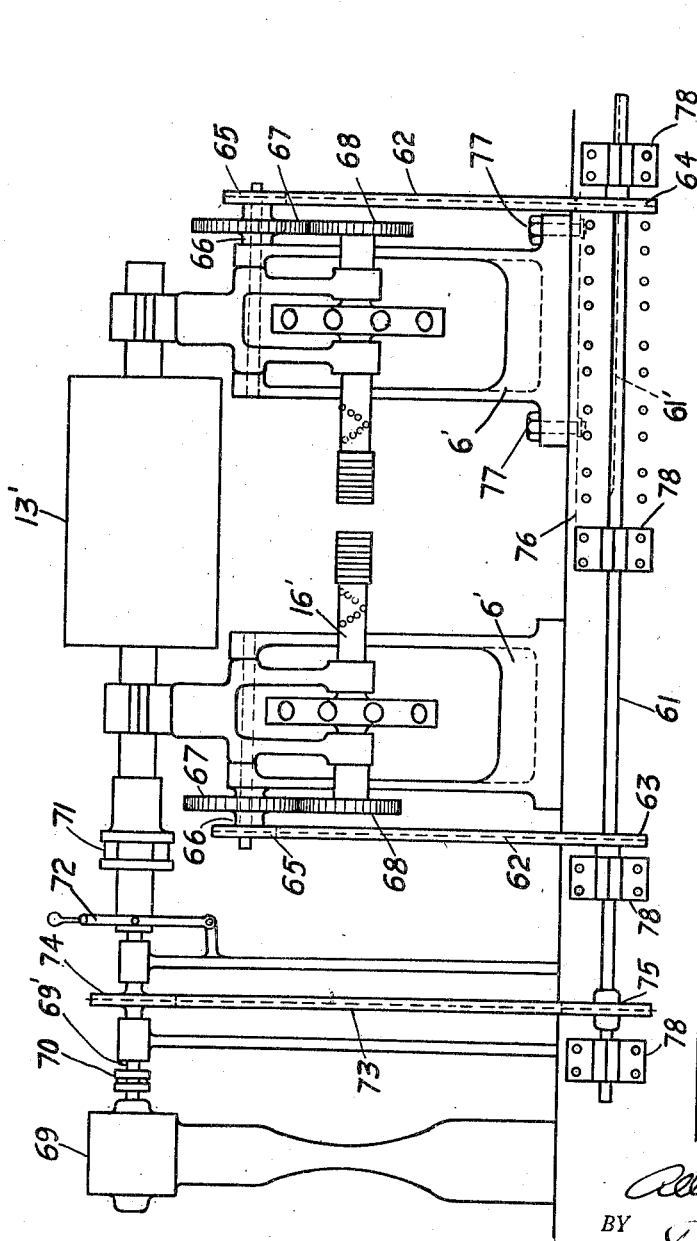

Sept. 15, 1925.
A. M. MacFARLAND
1,554,014
BALANCING MACHINE
Filed Feb. 4, 1920
6 Sheets-Sheet 5
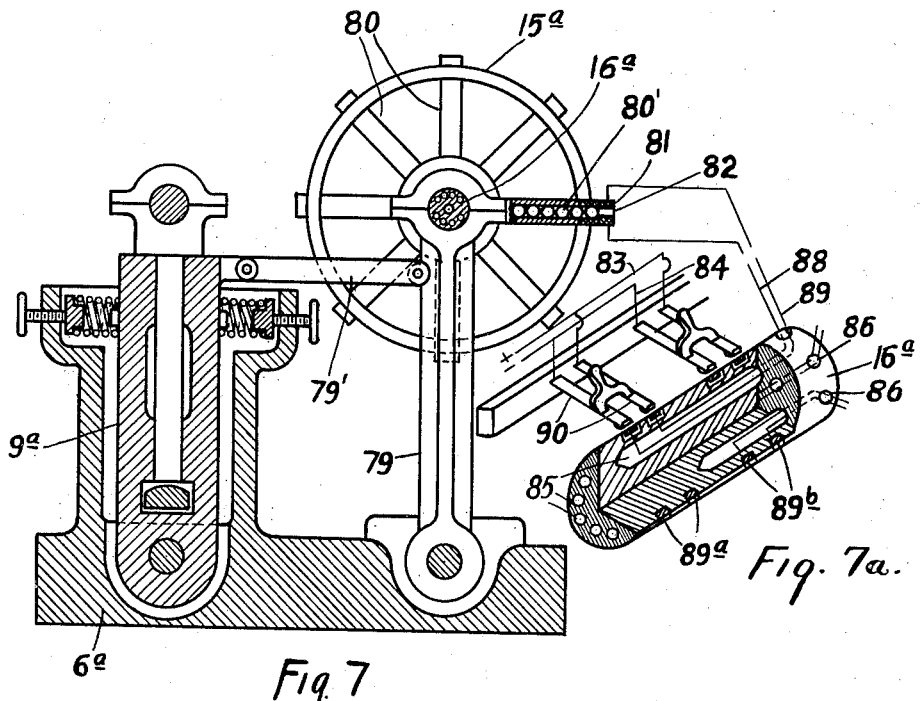
Fig. 7
Fig. 7a.
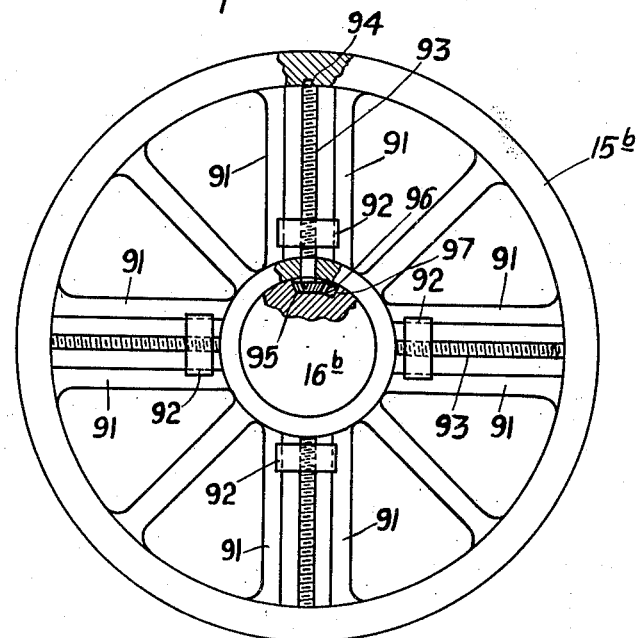
Fig. 8
INVENTOR.
Allison M MacFarland
BY
D C Davis
ATTORNEY.

Patented Sept. 15, 1925.

1,554,014

UNITED STATES PATENT OFFICE.

ALLIS M. MacFARLAND, OF GLEN OLDEN, PENNSYLVANIA, ASSIGNOR TO WESTINGHOUSE ELECTRIC AND MANUFACTURING COMPANY, A CORPORATION OF PENNSYLVANIA.

BALANCING MACHINE.

Application filed February 4, 1920. Serial No. 356,330.

*To all whom it may concern:*

Be it known that I, ALLIS M. MACFARLAND, a citizen of the United States, and a resident of Glen Olden, in the county of Delaware and State of Pennsylvania, have made a new and useful Invention in Balancing Machines, of which the following is a specification.

This invention relates to balancing machines, and particularly to that class of machines used for detecting the unequal distribution of mass in large rotary bodies such as turbine, motor or generator rotors. This invention has for an object to produce a simple machine capable of detecting unequal distribution of mass in rotors with such accuracy that the necessary correcting forces may be quickly and accurately applied to the rotor so as to establish both static and dynamic balance with a minimum of manipulation and testing.

Another object is to produce a balancing machine with which not only the location of a heavy spot may be readily determined, but with which the magnitude of the correction necessary to establish equilibrium may also be determined.

Another object is to produce a balancing machine which may be readily adjusted so as to receive a variety of sizes of rotors.

Another object is to provide a balancing machine having a counterbalance arranged so that its center of gravity may be adjusted while the body is rotating, for the purpose of determining the position and magnitude of the unequal distribution of material.

These and other objects which will be made apparent throughout the further description of the invention are attained by means of apparatus embodying the features herein described and illustrated in the accompanying drawings, wherein:

Fig. 1 is a side elevation of the complete balancing machine, certain portions of which are shown in vertical section.

Fig. 2 is a transverse vertical section on the line 2—2 of Fig. 1.

Fig. 3 is a transverse section through the counterbalance shaft showing a detail of the mechanism employed for supplying air and liquid to the counterbalance.

Fig. 4 is a longitudinal section through a fragment of the counterbalance and through the counterbalance shaft.

Fig. 5 is an enlarged detail section of the detector mechanism employed on the machine illustrated in Fig. 1.

Fig. 6 is a side elevation of a balancing machine having a modified means for driving the rotor and the counterbalance wheels.

Fig. 7 is a diagrammatic transverse section of a modified form of balancing machine.

Fig. 7a is a diagrammatic perspective view, partially in section, of a shaft member and cooperating structure found in Fig. 7.

Fig. 8 is an elevation of the balance wheel used upon a modified form of balancing machine.

Figure 9:
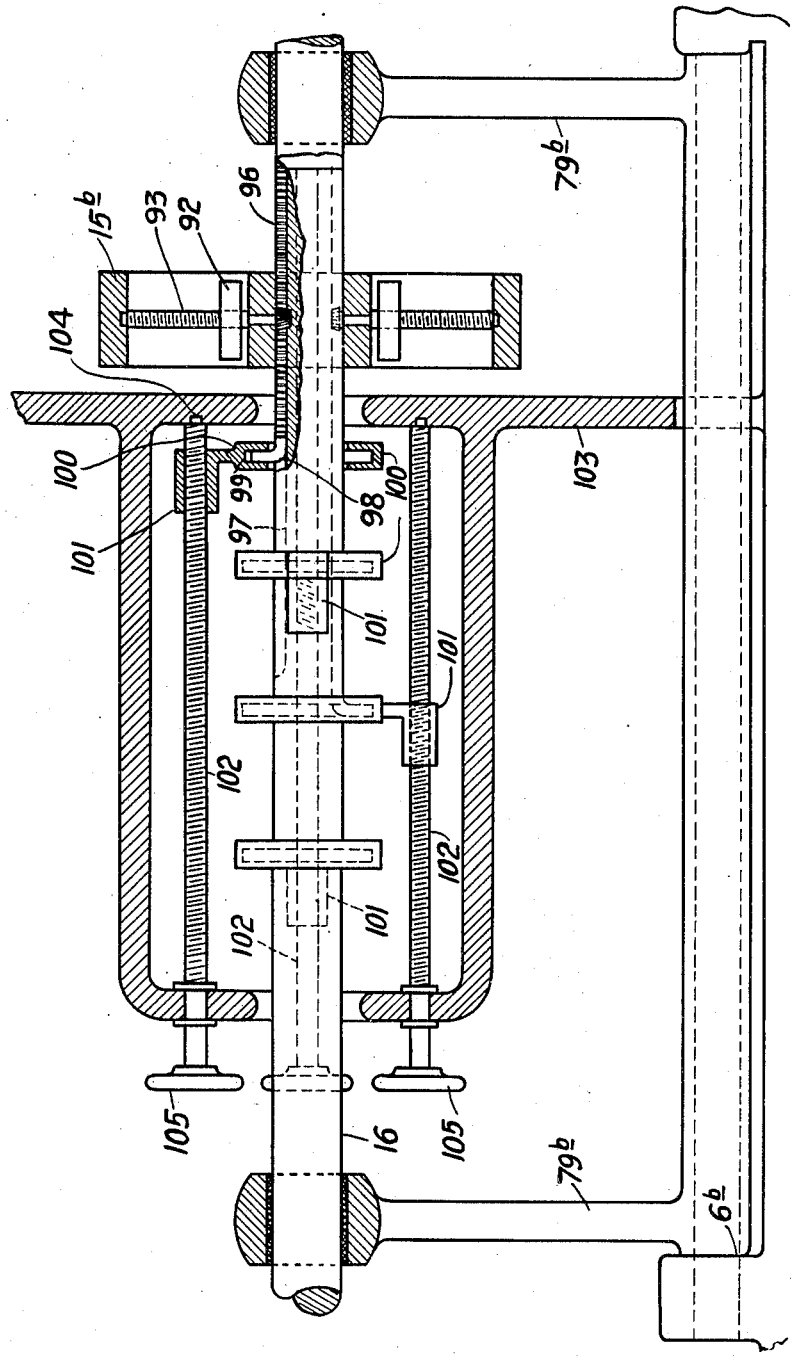
Fig. 9 is a diagrammatic transverse section of a modified form of balancing machine.

In balancing machines commonly used the body to be investigated for balance is rotatively mounted in such a way that it is capable of vibrating or oscillating in response to the unbalanced forces occasioned by the improper weight distribution and the rotation of the body. The heavy spots are usually determined by a stylus adapted to mark the point on the rotating body which moves to the extreme lateral position during the oscillations. Such a method necessitates stopping of the rotating body so that the point marked by the stylus may be ascertained, and it does not give the operator any information as to the magnitude of the disturbing force occasioned by the unequal distribution of materials, and consequently a correcting mass must be applied and the rotor again rotated to determine whether the correction is sufficient. This is a "cut and try" operation which must be repeated a number of times before the proper correction in weight distribution can be accomplished.

Bodies out of dynamic balance offer greater difficulties and require great care and numerous trials before proper correction is obtained. It is one of the purposes of this invention to provide a machine with which both the locations and magnitudes of the unbalanced masses may be easily and quickly determined, so that the time and labor required for the correction of the rotor is reduced to a minimum.

This and the foregoing objects are attained in a machine having a rigid frame in which a centrally pivoted cradle is mounted for oscillation. One end of the cradle supports the body to be balanced, hereinafter referred to as a rotor, and the opposite end carries a rotary counterbalance which is rotated synchronously with the body, but in the opposite direction. The counterbalance is divided into equally spaced chambers or cylinders adapted to receive liquid which may be separately injected into the chambers. The locations of the heavy spots are determined by detector mechanism provided for that purpose and liquid is injected into the chamber of the counterbalance corresponding to the light side of the rotor. When sufficient liquid is injected to balance the oscillating forces generated by the revolving rotor, the rotor and counterbalance are stopped and the quantity of liquid counter-weight found necessary to produce a condition of dynamic balance is determined. From this data the location and magnitude of the unbalanced mass may be quickly determined and the proper correcting mass may then be applied to the rotor. The rotor may then be rotated to test the accuracy of the correction, and any slight error can be detected by a repetition of the operation just described.

Referring to the drawings, the machine includes a pair of spaced frames or pedestals 6 which carry the balancing mechanism. These frames are mounted upon a base 7 in such a manner that they may be adjusted so as to receive rotors of various lengths. The mechanism of both pedestals is identical and the description of one will suffice for an understanding of both.

Each frame is provided with a pivot shaft 8 upon which a cradle 9 is mounted for oscillation. The upper end of the cradle is provided with a bearing block 10 which is pivotally mounted on the cradle by means of a vertical shaft 10' so that it is free to oscillate in a plane transverse to the axial plane of the pivot shaft, therefore a shaft mounted in the bearing block 10 is free to oscillate about a horizontal and vertical axis. The bearing block 10 is provided with a bearing bushing 11 adapted to fit the shaft 12 of a rotor 13. The block is constructed so that bushings having various diameters may be inserted to accommodate shafts having corresponding diameters.

The lower end of the cradle 9 consists of two depending arms 14 between which is mounted a counterbalance wheel 15. The wheel is mounted on a shaft 16 which is journaled in bearings 17 disposed at the lower extremity of the cradle arms 14. The shaft 16 projects through both bearings and the outer end thereof is provided with a driving gear 18, while the end projecting toward the opposite frame 6 is provided with an oscillation detecting mechanism to be hereinafter described.

The rotor 13 and the counterbalance wheels 15 are adapted to be synchronously driven in opposite directions through the medium of a chain driven driving hub 19 mounted upon each shaft 8. One of the hubs 19 is provided with a sprocket 20 which may be connected to any suitable driving unit such as a motor, not shown. The hub 19 is also provided with a gear 21 adapted to mesh with the gear 18, and a sprocket wheel 22 which is connected to a sprocket 23 by means of a driving chain 24. The sprocket 23 is preferably mounted upon a detachable hub 25 and is constructed so that hubs adapted to fit rotor shafts of various diameters may be applied to the sprockets.

It will be apparent from the foregoing that when the hub 19 provided with the driving sprocket 20 is rotated, the counterbalance wheel 15 and the rotor 13 will rotate in opposite directions, and the counterbalance wheel of the opposite frame will be rotated by means of its driving connection with the rotor shaft. The gears 18 and 21 and the sprockets 22 and 23 are proportioned so that the rotor and counterbalance wheel are rotated synchronously and therefore if the rotor has an unbalanced mass on one side, such mass will be counterbalanced by applying a counterbalancing mass to the side of the wheel corresponding to the light side of the rotor.

The location of the unbalanced mass is determined by means of an oscillation detector mechanism illustrated in enlarged scale in Figs. 4 and 5. The detector includes a frame 26 which is adapted to be secured to the rigid frame 6 and is provided with a series of vibrating teeth 27 consisting of thin strips of spring metal mounted in a row in spaced relation upon a frame 28 which is slidably mounted in the frame 26. The frame 28 and the teeth 27 attached thereto will be hereinafter referred to as a detector arm 29. The arm is normally held in retracted position by means of a helical spring 30 surrounding the shank 31 of the arm and disposed between the frame 26 and an adjustable nut 32 threaded upon the shank. Adjustment of the position of the detector arm with respect to the counterbalance wheel shaft 16 is accomplished by turning the adjustment screw 33 which is threaded in the frame 26 and which engages the end of the shaft 31.

The frame 26 is so disposed upon the frame 6 that the detector arm may be moved in close proximity with the shaft 16 as indicated in Fig. 5. The shaft is provided with a series of equally spaced projecting pins 34 arranged about the shaft in a helical path as indicated in Figs. 1 and 4. The pins are so disposed that each one rotates in the plane of one of the teeth 26. For the purpose of identification the teeth are lettered $a$—$b$—$c$—$d$—$e$—$f$—$g$—$h$ and the pins which respectively cooperate therewith are lettered $a'$—$b'$—$c'$—$d'$—$e'$—$f'$—$g'$ and $h'$, the pin $a'$ being registered with the tooth $a$, etc. When the rotor is standing at rest the detector arm is moved toward the shaft 16 so that the pins 34 nearly touch the vibrating teeth. Oscillations of the shaft 16, which are caused by the uneven distribution of mass in the rotor, will cause certain pins on the shaft 16 to move into engagement with their respective teeth and thereby indicate the side of the rotor having the heavy spot. As the rotor is free to oscillate about a horizontal axis when rotated, a heavy spot on the side of the rotor corresponding to the side of the counterbalance wheel on which the pin $a'$ is located will cause the pin $a'$ to move into contact with the tooth $a$, thus indicating the location of the heavy spot by causing the tooth $a$ to vibrate. If the heavy spot in the rotor is located on the rotor in a circumferential position corresponding to the circumferential position of the pin $d'$ on the counterbalance wheel, then the tooth $d$ will be caused to vibrate by being struck by the pin $d'$.

Observations of the detector arms at each end of the machine are simultaneously taken and as it is found that different teeth are vibrating, for example, the tooth $a$ of one detector arm and the tooth $d$ of the other, it is an indication that the rotor is not only dynamically unbalanced, but that the condition of unbalance is occasioned by two heavy spots which are not in the same axial plane.

After the planes in which the heavy spots are located have been determined, it is necessary to determine the magnitude of the unbalancing mass or masses. This operation is quickly accomplished by the means provided for altering the position of the center of gravity or of the gravity axis of the counterbalancing wheel with relation to the axis of rotation. The wheel is provided with a series of radially disposed cylinders 35 lettered for identification $a''$—$b''$—$c''$—$d''$—$e''$—$f''$—$g''$ and $h''$, one for each pin on the shaft 16, and disposed diametrically opposite the circumferential position of its corresponding pin, as indicated in Fig. 1.

As shown in Fig. 4, each cylinder 35 consists of a glass tube 36 encased in a projecting housing 37 provided with a longitudinal slot 38 through which the contents of the tube are visible. Each tube is provided with a centrally disposed vent 37' for the purpose of permitting the escape of air therefrom when the tube is being charged with fluid in the manner to be hereinafter described. The end of the cylinder is closed by a head 39 provided with a relief valve 40 which may be of any suitable type. This valve is preferably of a construction which will be held closed against pressures due to centrifugal force generated by the normal rotation of the counterbalance but which will open when the pressure in the tube is increased to a determined degree by the injection of fluid pressure into the cylinders in a manner to be hereinafter described.

The cylinders $a''$—$b''$—$c''$, etc., are adapted to be supplied with liquid while the rotor and the counterbalance wheel are synchronously rotating. In order to supply liquid to the cylinders of the rotating counterbalance wheel, the shaft 16 is provided with a series of trunnion collars or slip rings $a^3$—$b^3$—$c^3$, etc., for supplying the respective cylinders with fluid. These collars are arranged face to face and are adapted to snugly fit cylinders $a^4$—$b^4$—$c^4$, etc., respectively, formed in stepped relation upon the end of the shaft 16 as indicated in Figs. 1 and 4.

The trunnion rings are connected with sources of fluid supply by means of pipes $a^5$—$b^5$—$c^5$, etc., respectively, connected with the trunnion rings $a^3$—$b^3$—$c^3$, etc., and fluid delivered to the trunnion rings by the said pipes is received in annular grooves $a^6$—$b^6$—$c^6$, etc. Passages $a^7$—$b^7$—$c^7$, etc., extending through the shaft 16 and provided at one end with radial passages $a^8$—$b^8$—$c^8$, etc., respectively, establish communication respectively between the inner ends of the cylinders $a''$—$b''$—$c''$, etc., and the annular grooves $a^6$—$b^6$—$c^6$, etc., of the trunnions. It will be apparent from the foregoing that when fluid is supplied to the trunnion rings $a^3$, for example, that it will be delivered to the cylinder $a''$ and that when fluid is supplied to the trunnion $e^3$, it will be delivered to the cylinders $e''$, etc.

The trunnion rings are fitted to the shaft 16 so that there can be no leakage of fluid from one trunnion to another and are held in assembled relation by means of a plate 41 which is secured to the shaft 16 by means of a bolt 42. The passages $a^7$—$b^7$—$c^7$, etc., may be drilled in the shaft 16 from the end thereof, in which event the open ends of the passages may be closed by means of suitable screw plugs 43.

Both air and water are supplied to the trunnions by pipes 44 and 45 respectively, which are connected to the pipes $a^5$, $b^5$, $c^5$, etc., as shown in Figs. 1, 3 and 4. The pipes $a^5$, $b^5$, $c^5$, etc., are provided respectively with valves $a^9$, $b^9$, $c^9$, etc., disposed between the trunnions and water supply pipe 45 and adapted to control the delivery of water to the various trunnions and their respective cylinders $a''$—$b''$—$c''$, etc.

The air supply pipe 44 is connected to the pipes $a^5$—$b^5$—$c^5$, etc., by pipes $a^{10}$, $b^{10}$, $c^{10}$, etc., respectively, which are provided with valves $a^{11}$, $b^{11}$, $c^{11}$, etc., for the purpose of controlling the supply of air to the trunnions. The air and water supply to the pipes 44 and 45 is controlled by valves 46 and 47 respectively.

From the foregoing it will be apparent that any cylinder of the counterbalance wheel may be supplied at will with liquid while the said wheel is rotated and that water may be forced from any cylinder while the wheel is rotating by forcing air into the cylinder under sufficient pressure to cause the relief valve 40 to open. The valve 40 is provided with an operating handle 56 whereby the relief valve may be normally operated.

Vibrations of the cradle are dampened by means of helical springs 57 disposed on either side of the cradle as indicated in Fig. 2. The tension of the springs is adjusted by means of adjustment screws 58 which are threaded in cross webs 59 of the frames 6. The ends of the screws bear against sockets 60 which contact with the outer ends of the springs 57 and which retain them in place. Tension is increased by turning the screws so that the sockets are moved toward the cradle. Should the unbalanced mass cause excessive vibration of the rotor shaft and cradle, the screws are adjusted so as to increase the tension of the springs 57, thereby dampening the oscillations of the cradle.

The method of balancing a body by means of the above described balancing machine is as follows:

Frames 6 are first relatively adjusted upon the base 7 so that bearings 10 are spaced properly to receive the shaft of the rotor to be balanced and support the rotor between them. A sprocket 23 is then applied to each end of the rotor shaft so that the rotor may be driven by the sprocket 22 through the chain 24. Assuming that the cylinders of the unbalanced wheel 15 are empty and that they are normally perfectly balanced, it is apparent that oscillations of an unbalanced rotor will cause oscillations of the rotor shaft and the cradle supporting it. If the oscillations are excessive in magnitude, they are dampened by manipulation of the adjustment screws so that but slight oscillation is permitted. The detector arm 28 is then moved toward the shaft of the counterbalance wheel until one of the teeth is engaged by its corresponding contact pin carried by the counterbalanced shaft 16. Observations of the teeth on the detector arms on each end of the balancing machine are simultaneously taken and the identity of the vibrating tooth on each arm observed. If the rotor is unbalanced statically the corresponding teeth will vibrate at each end of the machine but if the rotor is unbalanced dynamically, contact pins in different axial planes will engage different teeth at each end of the machine.

After the vibrating teeth have been observed and noted, the oscillations of the rotor are then counterbalanced by injecting water into the cylinders of the counterbalanced wheel corresponding to the light side of the rotor as indicated by the detector mechanism. The cylinders may be so identified that, for example, when contact pin $a$ engages tooth $a'$, the rotor may be counterbalanced by applying liquid to the cylinder identified by the letter $a''$ and controlled by the valve $a^9$.

Assuming that at one end the tooth $a$ is vibrated and at the other end of the rotor the tooth $d$ is vibrated, equilibrium of the combined rotor and counterbalanced wheel may be obtained by injecting liquid into cylinder $a''$ at one end of the apparatus, by opening valve $a^9$ and cylinder $d''$ at the opposite end of the apparatus by opening valve $d^9$. During the period of injection of the liquid, the detector arm at each end of the apparatus is observed and sufficient quantity of liquid is injected to reduce vibration of the apparatus to a minimum, and to the point where the contact pins on the shaft 16 no longer engage any of the teeth on the detector arm. When such equilibrium has been established the rotor and counterbalanced wheel are stopped and the quantity of liquid required to bring the apparatus to equilibrium then determined by means of calibrations provided on the edge of the slot 38 of the cylinder housing. From this data the radial planes of unbalanced mass in the rotor may be determined and a proper quantity of mass may then be added to the rotor. With this apparatus the quantity of mass and the point of application may be so accurately determined that only two or three operations, such as that just described, are necessary to establish equilibrium of the rotor.

After the first test the liquid injected into the cylinders is withdrawn therefrom by either opening the valves manually or by forcing them open by injecting air supplied by the pipe 53 for that purpose. After the required estimated weight indicated by the detector apparatus has been applied to the rotor at the proper points of the apparatus the rotor and counterbalanced wheel are again rotated to determine the accuracy of the first application of the mass. Any imperfections in the balancing of the rotor are again indicated by vibration of certain teeth on the detector arm. Observations may then be made and proper corrected mass added to the rotor in a manner similar to that just described.

As shown, the machine illustrated in Fig. 1 is driven from a sprocket 20 mounted upon the pivot shaft 8, of one of the frames 6. The counterbalanced wheel of the opposite frame is driven through the rotor shaft by means of a chain drive.

In Fig. 6 I have shown a modified means for driving the balancing machine whereby the counterbalanced wheels in each frame are driven from a single motor driven shaft 61 by means of chains 62 connecting the sprockets 63 and 64 with the sprockets 65. The sprockets 65 are mounted upon hubs 66 which are provided with gears 67 adapted to mesh with gears 68 secured to the counterbalance shaft 16'.

The rotor 13' is directly connected to the driving motor 69 by means of a connection 69' including a flexible coupling 70 and a disengaging clutch 71 which is adapted to be moved in or out of engagement by a lever 72. The shaft 61 is rotated synchronously with the rotor shaft by means of a chain 73 which connects the sprocket 74 on the shaft 69' with the sprocket 75 mounted upon the shaft 61.

The frame 6, remote from the motor, is adapted to be moved along the bedplate 76 and anchored in any desired position by means of bolts 77, two of which are shown. The shaft 61 which is supported for rotation in bearings 78, is provided at its right end with a key slot 61' and the sprocket 64 is feathered thereon so that it may be moved to various positions along the shaft.

In Fig. 7 I have shown a modified form of balancing machine wherein the counterbalance wheel 15ª is mounted upon a standard 79 which is pivoted to the base 6ª supporting the rotor pedestal. The standard 79 is connected to the oscillating rotor pedestal 9ª by means of a pivoted link 79' so that oscillations of the rotor are transmitted to the counterbalance wheel. With the arrangement illustrated the direction and magnitude of the lateral oscillations of the counterbalance wheel are identical with those of the rotor. It will, of course, be understood that the counterbalance is rotated synchronously with the rotor. The counterbalance wheel differs from that illustrated in Fig. 2 in that instead of employing water cylinders, special cylinders 80 are arranged radially upon a central hub and are adapted to contain a plurality of balls or slugs 80' which are made of lead or other metal having a low fusing point. The balls are retained within the cylinder by means of a heating collar 81 having an opening 82 extending therethrough of slightly smaller diameter than that of the metal balls. When the counterbalance wheel is rotating the outermost ball in the cylinder is retained in contact with the heating collar by centrifugal force.

The heating collars are so connected to a source of electric current that any collar may be separately heated sufficiently to melt the ball in contact therewith so that the metal is free to pass through the opening in the collar and thus alter the weight of the counterbalance wheel. The instant one ball is forced from the wheel the next adjacent ball is moved into contact with the heating collar by centrifugal force where it will be subsequently melted providing a flow of current is maintained through the heating collar. The number of balls released from any cylinder therefore depends upon the duration of the flow of electricity through the heating collar.

In Fig. 7 I have diagrammatically illustrated a means for separately controlling the supply of current to the heating collars. As shown, the counterbalance wheel shaft 16ª, part of which is illustrated in perspective in a detached figure, is provided with a series of conduits 85 extending longitudinally into the shaft. Each conduit is provided with a radial outlet 86 through which a pair of insulated electrical conductors such as the wires 88 and 89 project from the conduits and lead to the heating collar disposed at the end of the cylinder which is opposite the outlet. The wires 88 and 89 extend through the conduits and the inner end of each wire is connected to a separate annular contact ring carried upon the exterior of the shaft 16ª. The rings are divided into groups 89ª, 89ᵇ, etc., two in each group and a group for each cylinder of the counterbalance wheel. Opposite each group of rings a pair of movable contact arms are disposed so that they may be depressed into contact with the rings with which they cooperate. With this arrangement current may be circulated through any cylinder from which it is desired to discharge metal while the counterbalance wheel is rotating. When a pair of contact arms are depressed into engagement with a pair of rings, current passes through wire 83, the contact arm 90 to which the wire is attached, the ring engaged by that arm, wire 88, heating collar 81, wire 89, the other contact ring of the group, the arm 90 engaging that ring, and wire 84. It will be seen from the foregoing that the weight in any cylinder may be reduced any desired amount. The particular cylinder from which metal is to be discharged is determined by the group of contact rings engaged by a pair of contact arms, and the quantity of metal discharged from the cylinder is determined by the length of time the circuit is held closed.

In Figs. 8 and 9 I have shown a modified means for altering the center of gravity of the counterbalance wheel. In the apparatus therein illustrated the center of gravity is altered by moving a series of weights radially from or toward the rim of the wheel. Means are provided for adjusting the position of the weights while the wheel is rotating so that the oscillations of the rotor being investigated may be counterbalanced by altering the center of gravity of the counterbalance wheel.

In this form of apparatus the counterbalance wheel 15$^b$ is mounted upon a shaft 16$^b$ which is mounted in an oscillating cradle 79$^b$ corresponding to the standard 79, shown in Fig. 7. The wheel is provided with four or more sets of radial guide spokes 91. Each set consists of a pair of parallel spokes between which a counterweight 92 is slidably mounted. The counterweight is adapted to be moved from and toward the rim of the wheel by means of a screw 93 which passes through a threaded hole in the counterweight and is mounted at its end in a socket 94 provided in the inner face of the rim. The inner end of the screw is journaled in the hub of the wheel and is provided with a gear 95 which meshes with a rack 96 slidably mounted longitudinally of the shaft 16$^b$ and which is reciprocable in a longitudinal slot 97 provided in the surface of the shaft. Movement of the rack longitudinally within its respective slot or groove imparts rotary movement to the screw 93 which, in turn, moves the counterweight 92 toward or away from the rim of the wheel, the direction of movement, of course, depending upon the direction of movement of the rack.

In order that the rack may be moved longitudinally of the shaft in either direction while the shaft and counterbalance wheel are rotating, the end of each rack is provided with an outturned end 98 which projects beyond the surface of the shaft into an annular groove 99 provided in the inner face of a slip collar 100. Each slip collar is provided with a radial extension terminating in a threaded nut or lug 101 adapted to receive an operating screw 102. There are four of such operating screws, one for each slip collar and each screw is mounted for rotation in a stationary frame 103 carried upon the base 6$^b$ of the balancing machine. The inner end of each screw is mounted in a socket 104 of the frame 103 and the outer end is journaled in an extension of the frame and is provided with a hand wheel 105 by which the screw may be manually operated. It will be apparent from the foregoing that rotation of one of the screws 102 will cause the slip ring mounted thereon to move longitudinally and thereby move the rack cooperating therewith. Movement of the rack causes the screw 93 cooperating therewith to rotate and thereby cause radial movement of the counterweight 92. With this arrangement the position of any counterweight may be changed to alter the center of gravity of the counterbalance wheel while it is rotating.

While I have described and illustrated but four embodiments of my invention, it will be apparent to those skilled in the art that various changes, modifications, additions and omissions may be made in the apparatus described and illustrated without departing from the spirit and scope of the invention as set forth by the appended claims.

What I claim is:

1. In a balancing machine, an oscillatory cradle in which the body to be balanced is rotatively mounted, a counterbalancing element mounted on said cradle, and rotative about an axis eccentric to that of said body comprising a body dynamically balanced with reference to its axis of rotation, means for synchronously rotating said body and said counterbalancing element, indicator elements associated with said counterbalancing element for indicating the circumferential position of the unbalanced weight concentration of said body, and means for adding weight to said counterbalancing element at a circumferential position corresponding to the position of the unbalanced weight of said body while said body and said element are rotating, said oscillatory cradle being adapted to oscillate in a plane normal to the rotational axes of the body and the counterbalancing element.

2. In a balancing machine, the combination of a pair of oscillatory mechanisms for supporting a body to be balanced, counterbalancing means carried by the mechanisms, and bearings for the body carried by the respective mechanisms and movable about axes which are transverse to the respective axes of oscillation.

3. A balancing machine comprising a pair of spaced supports mounted for oscillation, bearings mounted in the supports for oscillation in a different plane than that in which the supports oscillate, the said bearings being adapted to receive the shaft of the body to be balanced and rotatably support the body between them, and means for applying forces to the supports adapted to balance the oscillating forces occasioned by rotation of the said body.

4. In a balancing machine, the combination of oscillatory means for supporting a body to be balanced, detecting mechanism to visibly indicate points of unbalance, and means for diminishing oscillations of said body including a fluid system with valve devices co-ordinated with said detecting mechanism so that the indicated points of unbalance may be compensated for to diminish oscillations.

5. A balancing machine comprising a support, a cradle pivoted to said support and provided on one side of the pivot with a bearing adapted to rotatably support the body to be balanced, a rotatable counterbalance mounted on the side of the cradle pivot opposite the said bearing, and means for varying the center of gravity of the counterbalance so that it balances the oscillatory forces occasioned by the rotation of the said body.

6. A balancing machine comprising a support, a cradle pivoted to said support and provided on one side of the pivot with a bearing adapted to rotatably support the body to be balanced, a rotatable counterbalance pivoted to the cradle, on the opposite side of the pivot, means for synchronously rotating the body and the counterbalance in opposite directions, and means for varying the center of gravity of the counterbalance.

7. In a balancing machine, the combination with oscillatory means for supporting a body to be balanced, a rotary member carried by said means, a spirally arranged series of angularly spaced contacts carried by the rotary member, and a series of vibratory members adapted to cooperate with the contacts to visibly indicate points of unbalance.

8. A balancing machine comprising an oscillatory support provided with a bearing adapted to rotatably support the body to be balanced, a counterbalance member adapted to be rotated in determined relation with the said body, spaced receptacles in the said member adapted to receive and discharge liquid, and means for supplying fluid under pressure to the said receptacles whereby the liquid is caused to discharge from the receptacles.

9. A balancing machine comprising an oscillatory support provided with a bearing adapted to rotatably support the body to be balanced, a counterbalance member adapted to be rotated in determined relation with the said body, spaced receptacles in the said member adapted to receive and discharge liquid, and means for controlling the supply and discharge of liquid to and from the said receptacles while the said member is rotating.

10. A balancing machine comprising a frame, a cradle pivotally mounted on the frame and having a bearing disposed on one side of the frame adapted to rotatably support the body to be balanced, a counterbalance on the cradle, disposed on the side of the pivot opposite the bearing cradle, and yielding means disposed between the cradle and the frame for dampening the oscillations of the cradle.

11. In a balancing machine, the combination with a pair of oscillatory devices having bearings for a body to be balanced, of a secondary rotary body carried by each of the devices, means associated with each of the secondary rotary bodies to indicate the position of the unbalancing force of said body being balanced, a circumferential series of fluid receptacles carried by each of said secondary rotary bodies, means for supplying fluid to each of the receptacles, and controlling means for each of the last-named means and capable of operation in accordance with the indications of said indicating means.

12. In a balancing machine, the combination with a pair of oscillatory devices having bearings for supporting a body to be balanced, of a secondary rotary body carried by each of the devices and normally in dynamic balance, detector mechanism associated with each of the secondary rotary bodies to indicate the angular position of the unbalanced force set up by the body being balanced, a plurality of receptacles carried by each secondary rotary body and spaced relatively thereto in accordance with the angular positions of unbalance capable of indication by the detector mechanism, means for supplying fluids of different densities to each of the receptacles, and controlling means for the latter means capable of operation in accordance with the indications of the detector mechanism.

13. In a balancing machine, the combination with a pair of oscillatory devices having bearings to support a body to be placed in dynamic balance, of a secondary rotary body carried by each of the devices, detector mechanism associated with each of the rotary bodies for indicating the angular position of the unbalanced force of said body being balanced, a plurality of receptacles carried by each secondary rotary body and spaced relatively thereto in accordance with the angular positions of unbalance capable of indication by the detector mechanism, means for supplying fluid to each of the receptacles, means for controlling the last-named means in accordance with the indications of the detector mechanism, and means associated with each of the receptacles to indicate the respective quantities of fluid therein.

14. In a balancing machine, the combination with a pair of oscillatory bodies having bearings to support a body to be balanced, of a secondary rotary body carried by each of the devices and normally in dynamic balance, detector mechanism for determining the angular position of the unbalanced force of the body being balanced, a plurality of receptacles carried by each secondary rotary body, means for admitting liquid to each of the receptacles to compensate for the unbalanced forces of the body being balanced, means for admitting air to each of the receptacles, and a relief valve associated with each receptacle to relieve abnormal pressures created therein.

15. In a balancing machine, the combination of a pair of pivoted devices having means for supporting a body to be balanced, secondary rotary bodies carried by the respective devices and normally in dynamic balance, detector mechanisms each including a plurality of indicating devices to indicate the condition and angular position of unbalance of the body being balanced, and fluid means cooperating with the rotary bodies to unbalance the latter including a plurality of receptacles carried by each rotary body and spaced similarly to the positions capable of indication by said detector mechanisms with separate means for supplying fluid to each receptacle including a controlling device which may be operated in accordance with the indications of said detector mechanism.

16. In a balancing machine, the combination with a pair of oscillatory devices each having a bearing for a body to be balanced and a secondary rotary body normally in dynamic balance but whose mass may be so distributed as to set up forces counteracting the unbalanced forces of the body tending to set up oscillations, of a series of contacts angularly and longitudinally spaced with respect to each secondary rotary body, vibratory members adapted to be at times operated by the respective contacts, and means cooperating with the secondary rotary bodies whereby the mass of each may be distributed in accordance with which vibratory members are vibrated.

In testimony whereof, I have hereunto subscribed my name this 21 day of January, 1920.

ALLIS M. MacFARLAND.